United States Patent Office 3,401,488
Patented Sept. 17, 1968

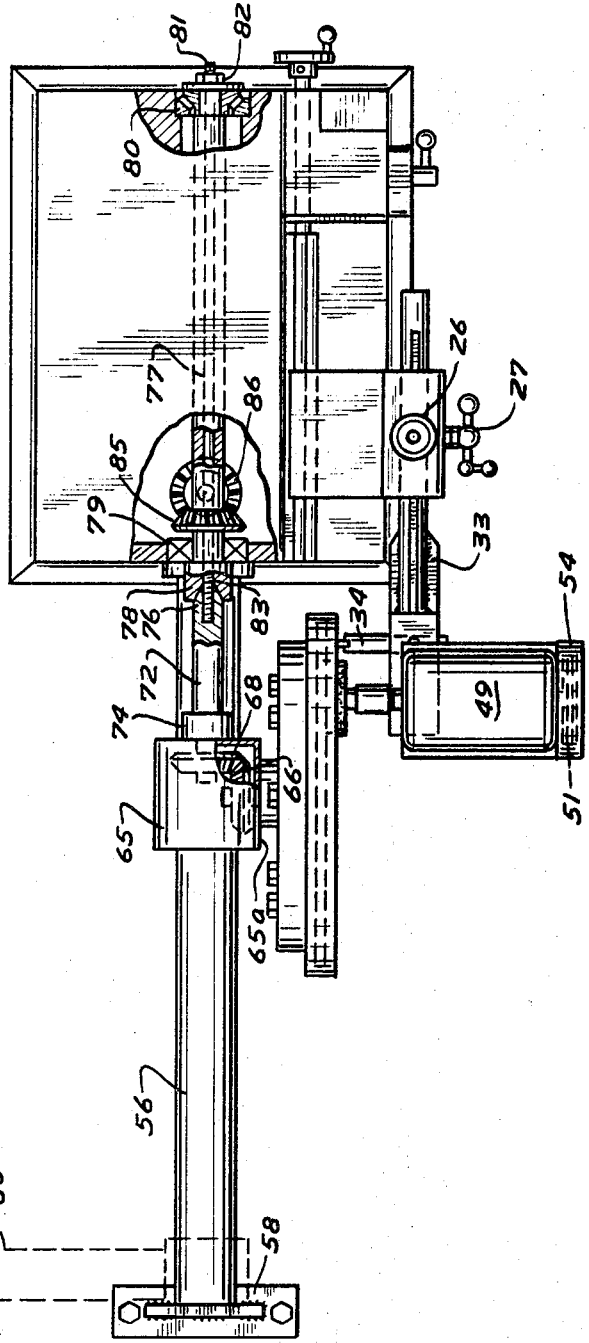

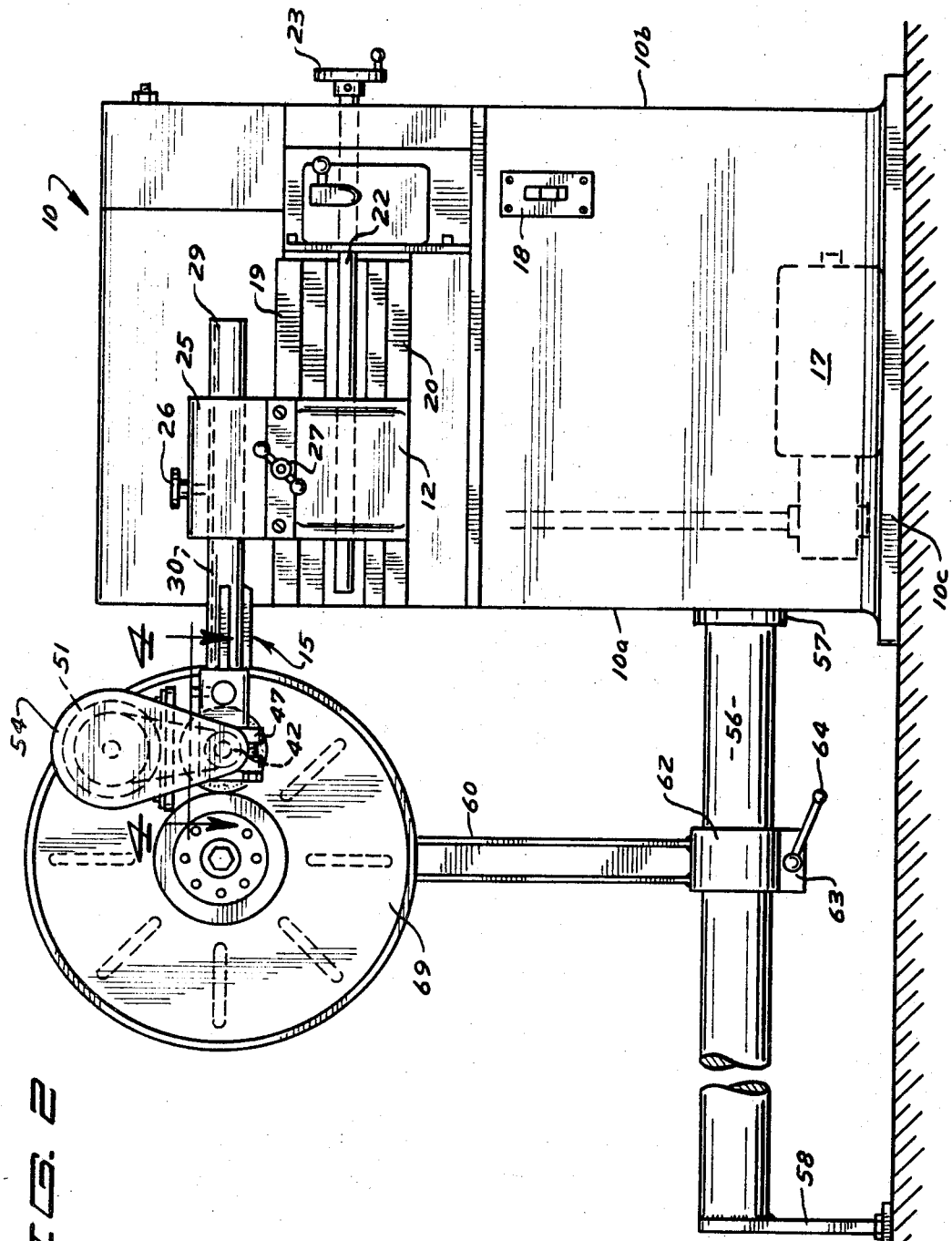

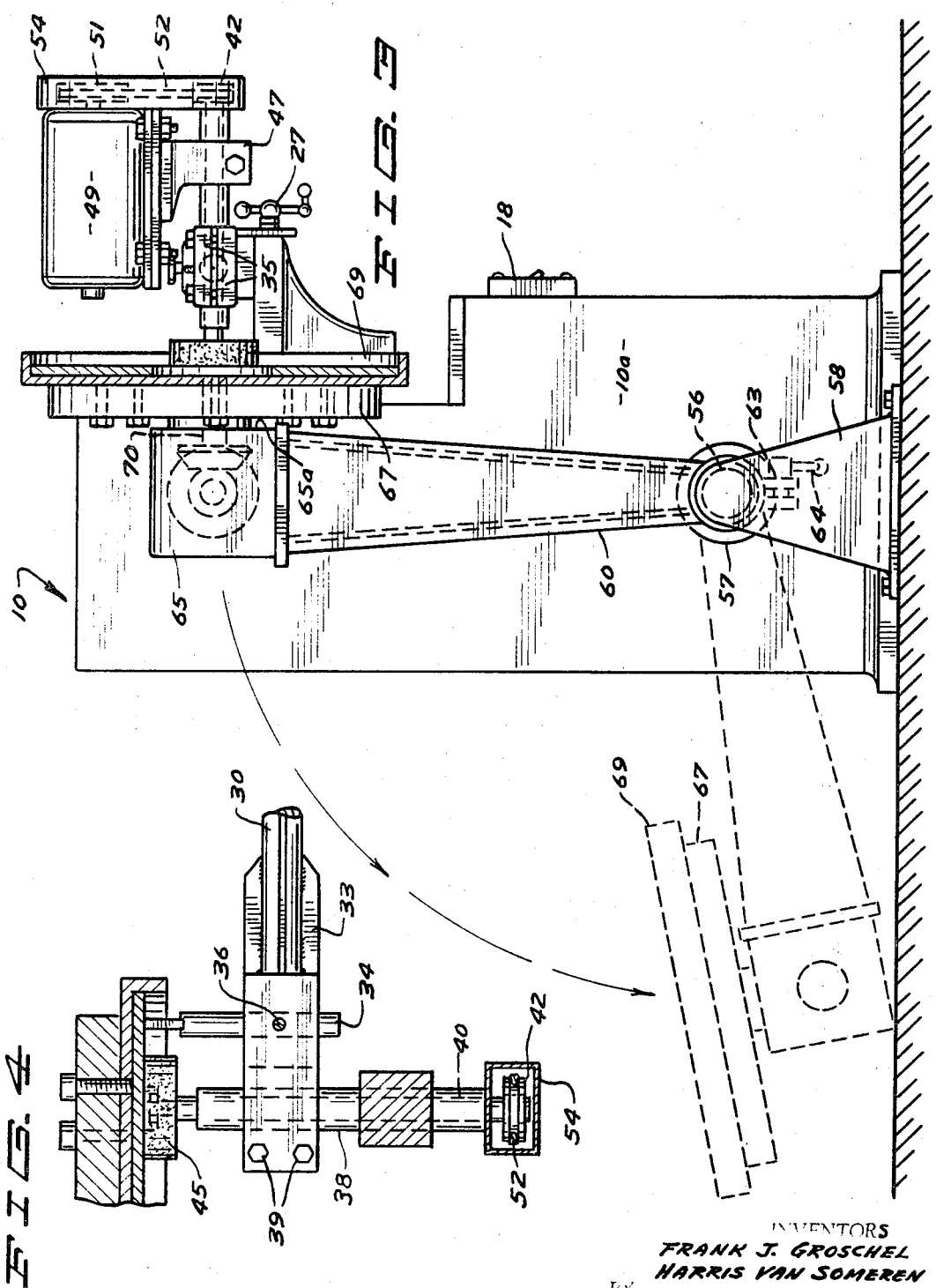

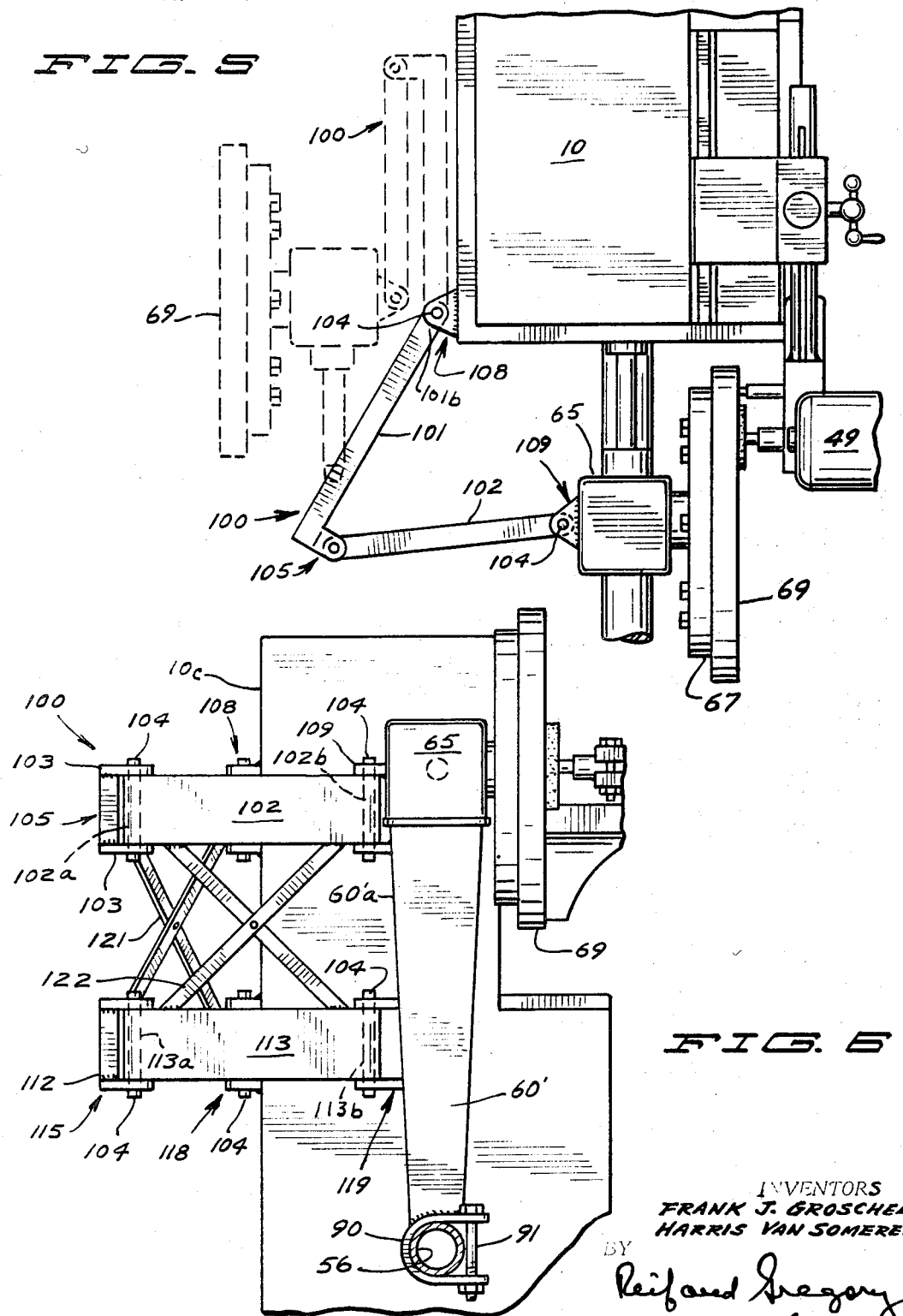

3,401,488
REFACING APPARATUS
Frank J. Groschel and Harris Van Someren, Minneapolis, Minn., assignors to Star Machine & Tool Co., Minneapolis, Minn., a corporation of Minnesota
Filed June 28, 1965, Ser. No. 467,501
4 Claims. (Cl. 51—5)

ABSTRACT OF THE DISCLOSURE

An apparatus for refacing fly wheels and the like adapted for mounting onto a conventional brake drum lathe consisting of a rail extending outwardly from one side of the housing of the brake drum lathe in a direction parallel to the direction of the movement of the carriage of said lathe, a pedestal swingably upstanding on said rail supporting a work holding member adapted to re-orient work 90 degrees with respect to the work otherwise handled by said lathe and an attachment mounted on the carriage of said lathe carrying a bar disposed axially of said carriage and supporting a grinding wheel, and means for driving the same in a direction at right angles to itself whereby said grinding wheel is adapted to engage the face of a work piece held by said pedestal and said carriage moves said grinding wheel across the face of a work piece.

---

This invention relates to improvement in an apparatus for refacing the surfaces of clutch plates, flywheels and the like.

More particularly it is an object of this invention to provide an attachment for a conventional type of brake drum lathe to adapt said lathe readily for refacing fly wheel and like surfaces.

A conventional type of brake drum lathe holds the work piece so that the surface to be turned or worked upon is disposed in a plane parallel to the axis of the cutting tool as well as parallel to the axis of itself whereby the cutting tool describes a path across the surface worked upon.

Unlike the cylindrical working surfaces of brake drums, fly wheels, clutch plates and the like provide flat circular surfaces normally disposed in a plane at right angles to their own axes as well as at right angle to the axis of the grinding member of a brake drum lathe and said lathe is not suitable for grinding surfaces which are so disposed. It is desirable however for purposes of economy and efficiency to adapt a single lathe and particularly a brake drum lathe to be suitable for turning brake drums and also adaptable for refacing fly wheels and the like.

It is an object of this invention therefore to provide simple and efficient means for adapting a conventional brake drum lathe to be suitable for refacing fly wheels and the like.

It is another object of this invention to provide a relatively simple attachment for a brake drum lathe whereby the member of the lathe normally holding the cutting tool is utilized for its usual operation, and said attachment supports and reorients the work piece 90 degrees.

With reference to the above object, it is also an object of this invention to have said attachment for the drum lathe readily set aside during the otherwise use of said lathe.

These and other objects and advantages of the invention will be fully set forth in the following description made in connection with the accompanying drawings in which like reference characters refer to similar parts throughout the several views and in which:

FIG. 1 is a top plan view of the apparatus herein with some portions broken away and a portion thereof being shown in dotted line in alternate position;

FIG. 2 is a view in front elevation with some portions thereof being shown in dotted line and a portion being broken away;

FIG. 3 is a view similar to FIG. 1 in end elevation;

FIG. 4 is a broken view in horizontal section taken on line 4—4 of FIG. 2 as indicated;

FIG. 5 is a top plan view of a modification of the apparatus herein with a portion broken away and a portion thereof shown in alternate position in dotted line; and FIG. 6 is a view of the modified apparatus in end elevation with a portion thereof being broken away.

Referring to the drawings, a housing 10 is shown generally parallelepiped in form which is here intended to indicate a brake drum lathe of a conventional design comprising a carriage 12 which for the purpose of turning brake drums will carry a brake drum lathe adapter not here shown but said carriage is here shown equipped with a refacing adapter 15 as will hereinafter be described.

Said housing has side walls 10a and 10b and a base portion 10c. Mounted within said housing is a conventional power supply 17 schematically shown and which in practice will be a suitable electric motor operated by the switch 18.

Said carriage 12 is mounted for movement axial of itself and lateral relative to said housing on ways 19 and 20 and is moved laterally by lead screw 22 which may be manually operated by the hand wheel 23 or may be driven by the motor 17 in a conventional manner of which the detail is not here shown.

Said carriage 12 has an upper portion 25 conventionally mounted thereon for transverse movement by a hand screw 27.

For the purposes herein, said carriage portion 25 is shown carrying an elongated bar 29 forming a supporting member having a T-slot 30 therein engaged by a T-screw 26 carried by said turret. Said bar in forming a supporting member has a forwardly extending enlarged head or free end portion 33 substantially rectangular in cross section and having a horizontal bifurcated mouth portion 35.

Carried in said head portion 33 disposed transversely therethrough is a cutting bar 34 held by a set screw 36. It will be understood that said head portion will be bored to receive said cutting tool.

Said bifurcated portion 35 has a tubular member 38 disposed transversely therethrough formed as a quill and forming an outboard support. Said tubular member will be clamped in position by the bolts 39. The jaws of said bifurcated portion will be adapted to accommodate said tubular member. Extending through said tubular member is a drive shaft 40 which will be journaled in said tubular member and will have portions extending outwardly thereof. The bearings in said tubular member will be of conventional design and are not here shown. The rearward end portion 41 of said shaft will carry a pulley 42 and the forward end portion 44 of said shaft will carry a suitable grinding wheel 45.

Mounted on said tubular member as by a bracket clamp 47 is a motor 49 carrying a pulley 51 in vertical alignment with said pulley 42 and a belt 52 passes over said pulleys. A housing 54 for said pulleys and belt is carried by said motor.

Extending outwardly of the side 10a of said housing 10 adjacent the base portion 10c is a supporting member 56 in the form of a rail shown here to be circular in cross section and which at its inner end will be secured to said housing as by a collar bracket 57. Supporting the free or extended end of said rail is an upstanding plate bracket 58. Said rail 56 will be positioned relatively close to floor level.

Pivoted to said rail 56 to be swingable thereon is an elongated supporting member 60 forming a pedestal having its foot portion 62 in the form of a circular bifurcated clamp disposed about said rail and having a handle equipped clamping bolt 64 disposed depending flange portions 63 of said foot portion. Said pedestal is readily movable axially of said rail.

Carried by said pedestal as by the head portion thereof is a 90 degree gear box 65 having journaled therein in a conventional manner what are here shown to be a pair of bevel gears 66 and 68 disposed in a right angled arrangement relative to one another.

Rotatively mounted in a known manner onto the forward face portion 65a of said gear box is one embodiment of a work piece retaining face plate 67 to which a work piece 69 such as the fly wheel shown may be attached by various conventional means such as bolts, clamps or wedges, and the like. Said face plate will be driven by the stub shaft 70 running from the gear 66.

Extending outwardly of the gear 68 and having a conventional driving connection therewith is a drive shaft or arbor 72 having one end journaled in a bearing housing 74 carried by said gear box 65 and having a tapered head portion 76 having an axial internally threaded bore. The head portion of said arbor is removably disposed within the sleeve 78 of a spindle 77 mounted in said housing 10 and being journaled at either end therein in bearings 79 and 80 as illustrated in FIG. 1. Disposed through said spindle is a draw bar 81 having a nutted outwardly extending end portion 82 and having its other end 83 reduced and threaded to be received into the adjacent tapped or internally threaded end portion of said arbor 72.

A bevel gear 85 is shown carried on said spindle 77 engaged by a bevel gear 86 which by conventional means will be connected to and driven by the motor 17.

*Operation*

When the apparatus 10 is used as a brake drum lathe, the pedestal 60 will have its clamp 62 loosened and it will be swung rearwardly as shown in dotted line to be out of the way.

For use for the purposes herein indicated, the pedestal 60 will be raised to vertical position. The arbor 72 will be aligned with the sleeve 78 of the spindle 77. The pedestal will be moved along the rail 56 to position the tapered end 76 of said arbor within said sleeve 78. The adjacent end 83 of the draw bar 81 will be threaded into said tapered end of said arbor to draw said arbor into operating engagement with said spindle 77. The draw bar is rotated by applying a wrench to the nutted portion 82 thereof. The clamp 62 of said pedestal will be tightened by use of the clamping bolt 64.

The supporting bar 29 will be mounted on the carriage 12. The drive shaft 40 will be equipped with a suitable grinding wheel 45.

A work piece 69 on the order of a flywheel will be mounted onto the face plate 67. The bar 29 will then be adjusted axially to position the grinding wheel adjacent the hub portion of the work piece. The grinding wheel as it operates will be drawn across the face of the work piece by the lead screw 22. The cutting bar 34 may be utilized for initial cutting purposes if desired.

The pedestal 60 and the arbor 72 provide such a solid support and secure holding for the face plate 68 that the work piece carried thereby is free from vibration of any consequence during the grinding operation. The bar 29 and the quill 38 firmly support the motor and the grinding wheel. The carriage 12 is utilized for its usual function of drawing the grinding wheel or cutting means used across the face of the surface being worked upon. A solid and substantial structure results.

A brake drum has a cylindrical working surface. A brake drum mounted in a wheel is readily supported through the wheel hub by an arbor on the order of the arbor 72. It will be understood that the brake drum surface to be worked upon with the housing herein used as a brake drum lathe would be disposed in a plane parallel to its own axis and parallel to the axis and direction of movement of the carriage 12.

In the work piece 69 indicating a clutch plate or fly wheel, the working surface or surface to be worked upon is in a plane at a right angle to the axis of the work piece. Thus to be supported to have its working surface in a plane parallel to the direction of movement of the carriage which carries the grinding or cutting means and draws the same across said working surface, the axis of the work piece must be oriented at a right angle to that of the position of a brake drum.

The use of the pedestal 60 with a 90 degree gear box mounted thereon and carrying the work supporting facing plate 67, very nicely and rigidly positions the work piece 69 to be oriented in a position 90 degrees from that of the corresponding position of a brake drum.

The supporting member 29 carries grinding apparatus which operates on the working surface of the work piece with said work piece being disposed in the same plane as the working surface of a conventionally positioned brake drum.

*Modification*

With reference to FIGS. 5 and 6, a modification of the above described apparatus is shown. The modification comprises principally supporting structure for the pedestal and the structure carried thereby.

The modified pedestal indicated by the character 60' is identical to the pedestal 60 with the exception that the lower portion thereof is arranged to form a U clamp 90 horizontally disposed to receive said support member 56 therein and to be secured in position by a nutted bolt 91 disposed through the apertured free end portions thereof.

For the purpose of supporting and horizontally swinging said pedestal 60' and the structure carried thereby from operating to storing position, a bracket 100 is provided.

Said bracket is of simple heavy-duty construction comprising a pair of upper arms 101 and 102. Said arm 101 carries at its inner end integral therewith a hinge 105 comprising a pair of vertically spaced aligned apertured lugs 103 disposed at right angles to said arm and receiving therebetween the adjacent vertically apertured end portion 102a of said arm 102 with a pin 104 being disposed through said lugs and said arm portion therebetween for a hinged connection.

The remote end portions 101b and 102b of said arms 101 and 102 are also vertically apertured to be received in hinge members 108 and 109 formed on the order of hinge 105 each comprising a pair of apertured vertically spaced lug portions. The hinge 108 is secured as by welding to the upper rear side 10c of said housing. The hinge 109 has one lug secured to an upper rear portion 60'a of the pedestal 60' and its other thereabove integral with an adjacent portion of said gear box 65. Pins 104 are disposed through said hinges and the apertured end portions of said arms 101 and 102 received therein.

A second and lower pair of arms identical with said first pair of arms is provided aligned with said first pair of arms and comprises arms 112 and 113 with said arm 112 carrying at its inner end portion a hinge 115 identical to said hinge 105 receiving therein the adjacent vertically apertured end portion 113a of the arm 113 with a pin 104 forming the hinge pin.

The remote ends of said arms 112 and 113 are received in hinges 118 and 119 which are respectively vertically aligned with said hinges 108 and 109 of identical construction. Hinge pins 104 are disposed through said hinges.

A truss structure ties said respective vertically aligned pairs of arms together being secured therebetween as by welding. Said truss structure comprises a pair of X frame members 121 and 122.

The operation of the bracket 100 is believed obvious from the above description taken with the drawings and conveniently positions the pedestal member in operating and in storage position.

Thus it is seen that we have provided a very simple, effective and efficient attachment for a brake drum lathe to readily and quickly convert it into an apparatus for grinding the surfaces of fly wheels. This apparatus has proved to be very successful in practice.

It will of course be understood that various changes may be made in the form, details, arrangement and proportions of the parts, without departing from the scope of applicant's invention which, generally stated, consists in a device capable of carrying out the objects above set forth, in the parts and combinations of parts disclosed and defined in the appended claims.

What is claimed is:

1. A refacing apparatus having in combination,
   a housing having a driving mechanism in connection therewith,
   a carriage mounted on said housing,
   means carried by said housing moving said carriage in a direction axially of said carriage,
   a supporting member carried by said carriage including a supporting arm disposed at right angles to the axis of said carriage,
   grinding means carried by said supporting arm arranged to grind a surface disposed in a plane parallel to the direction of travel of said carriage, driving means for said grinding means carried by said supporting arm,
   a supporting member integral with said housing extending outwardly from one side thereof in the direction of the axis of said carriage,
   a pedestal member, means clamping said pedestal member to said second mentioned supporting member for swinging movement thereof at right angles to the direction of movement of said carriage,
   a work piece supporting member carried by said pedestal member and arranged and constructed to hold a work piece in such position as to have the surface to be ground thereon disposed in a plane parallel to the direction of travel of said carriage, and
   means rotating said work piece supporting member connected with said driving mechanism.

2. The structure set forth in claim 1,
   a bracket supported by said housing, said bracket carrying said pedestal member to operating position clamped to said second mentioned supporting member and to storage position away from said second mentioned supporting member.

3. A refacing apparatus having in combination,
   a housing having a driving mechanism therein,
   a carriage mounted on said housing,
   means carried by said housing moving said carriage in a direction axially of said carriage,
   a supporting member carried by said carriage including a supporting arm disposed at a right angle to the axis of said carriage,
   grinding means carried by said supporting arm arranged to grind a surface disposed in a plane parallel to the direction of travel of said carriage, driving means for said grinding means carried by said supporting arm,
   supporting means extending outwardly from adjacent the base portion of said housing in the direction of the axis of said carriage,
   a pedestal member, means pivoting said pedestal member to said supporting means for vertical swingable movement thereon in a direction at right angles to the direction of movement of said carriage,
   a work piece supporting member carried by said pedestal member, said work piece supporting member being arranged and constructed to hold a work piece in such a position as to have the surface thereon to be ground disposed in a plane parallel to the direction of travel of said carriage, and
   means rotating said work piece supporting member connected with said driving mechanism.

4. A refacing apparatus having in combination,
   a housing having a driving means therein,
   a carriage mounted on said housing,
   a lead rod carried by said housing engaging said carriage to move said carriage in a direction axially of itself, means driving said lead rod,
   a supporting bar removably mounted in said carriage axially thereof extending forwardly thereof,
   a horizontally disposed tubular member carried at the forward end of said bar at a right angle thereto,
   a motor mounted on said tubular member, a shaft driven by said motor disposed through said tubular member extending outwardly thereof,
   grinding means carried by said shaft,
   a supporting rail extending outwardly of one side of said housing,
   an elongated support member, means clamping one end of said support member to said rail,
   a gear box carried by said elongated support member,
   a shaft removably connecting said gear box with said housing, said shaft securing said elongated support member in upstanding position, said driving means in said housing driving said shaft, and
   a work piece supporting face plate carried by said gear box, said face plate being disposed in a plane parallel to the direction of movement of said carriage, said face plate being driven by said shaft.

References Cited

UNITED STATES PATENTS

| | | | |
|---|---|---|---|
| 1,973,511 | 9/1934 | Schmalz | 51—56 X |
| 2,055,361 | 9/1936 | Oliver | 51—56 X |
| 2,683,341 | 7/1954 | Kock | 51—259 |
| 2,814,168 | 11/1957 | Wells | 51—89 |

LESTER M. SWINGLE, *Primary Examiner.*